(12) United States Patent
Kim et al.

(10) Patent No.: US 9,409,782 B2
(45) Date of Patent: Aug. 9, 2016

(54) METHOD OF FABRICATING SILICON CARBIDE POWDER

(75) Inventors: Byung Sook Kim, Seoul (KR); Jung Eun Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 139 days.

(21) Appl. No.: 14/129,222

(22) PCT Filed: Jun. 25, 2012

(86) PCT No.: PCT/KR2012/004992
§ 371 (c)(1),
(2), (4) Date: Dec. 24, 2013

(87) PCT Pub. No.: WO2012/177098
PCT Pub. Date: Dec. 27, 2012

(65) Prior Publication Data
US 2014/0127115 A1    May 8, 2014

(30) Foreign Application Priority Data

Jun. 24, 2011   (KR) .................... 10-2011-0061633

(51) Int. Cl.
| | |
|---|---|
| *C01B 31/36* | (2006.01) |
| *C01B 31/30* | (2006.01) |
| *C01B 33/00* | (2006.01) |
| *C04B 35/573* | (2006.01) |
| *B82Y 30/00* | (2011.01) |

(52) U.S. Cl.
CPC ................. *C01B 31/36* (2013.01); *B82Y 30/00* (2013.01); *C04B 35/573* (2013.01); *C04B 2235/3418* (2013.01); *C04B 2235/428* (2013.01); *C04B 2235/48* (2013.01); *C04B 2235/5288* (2013.01); *C04B 2235/6562* (2013.01); *C04B 2235/6581* (2013.01); *C04B 2235/6586* (2013.01)

(58) Field of Classification Search
None
See application file for complete search history.

(56) References Cited

U.S. PATENT DOCUMENTS

| | | | | |
|---|---|---|---|---|
| 5,370,854 A | * | 12/1994 | Henley ..................... | B01J 8/087 423/344 |
| 5,863,325 A | * | 1/1999 | Kanemoto et al. ........... | 117/105 |
| 6,217,841 B1 | * | 4/2001 | Grindatto ................. | B01J 27/22 423/249 |
| 6,503,572 B1 | * | 1/2003 | Waggoner ............. | C04B 35/565 427/228 |
| 6,627,169 B1 | * | 9/2003 | Itoh ........................ | C01B 31/36 423/345 |
| 6,793,875 B1 | * | 9/2004 | Shaw ..................... | B82Y 30/00 419/17 |

FOREIGN PATENT DOCUMENTS

| | | |
|---|---|---|
| JP | 3174622 B2 | 6/2001 |
| KR | 10-2010-0071863 A | 6/2010 |
| KR | 10-2011-0021530 A | 3/2011 |

OTHER PUBLICATIONS

Translation of KR-10-2010-0071863 (Unexamined Publication No.).*
International Search Report in International Application No. PCT/KR2012/004992, filed Jun. 25, 2012.

* cited by examiner

*Primary Examiner* — Guinever S Gregorio
(74) *Attorney, Agent, or Firm* — Saliwanchik, Lloyd & Eisenschenk

(57) ABSTRACT

A method of fabricating silicon carbide powder according to the embodiment comprises the steps of preparing a mixture by mixing a silicon source comprising silicon with a carbon source comprising a solid carbon source or an organic carbon compound; reacting the mixture; and controlling the reacting of the mixture, wherein the step of controlling the reacting comprises a step of supplying process gas or reaction product gas.

7 Claims, 1 Drawing Sheet

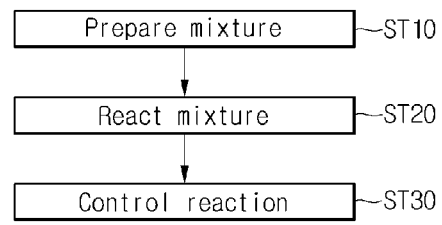

METHOD OF FABRICATING SILICON CARBIDE POWDER

CROSS-REFERENCE TO RELATED APPLICATIONS

This application is the U.S. national stage application of International Patent Application No. PCT/KR2012/004992, filed Jun. 25, 2012, which claims priority to Korean Application No. 10-2011-0061633, filed Jun. 24, 2011, the disclosures of each of which are incorporated herein by reference in their entirety.

TECHNICAL FIELD

The embodiment relates to a method of fabricating silicon carbide powder.

BACKGROUND ART

Recently, silicon carbide has been used in various electronic devices as a semi-conductor material for various purposes. In particular, the silicon carbide is very useful because the silicon carbide has the superior physical strength and high resistance against the chemical attack. In addition, the silicon carbide represents the superior electronic characteristics, such as the high radiation hardness, high breakdown filed, relatively wide bandgap, high saturated electron drift velocity, high operating temperature, and high absorption and emission of quantum energy in the blue, violet and ultraviolet bands of a spectrum.

The silicon carbide powder can be fabricated by mixing and heating source materials, such as a silicon source and a carbon source. In fabrication of the silicon carbide powder, it is important to increase the recovery rate of the silicon carbide powder from the mixture materials.

DISCLOSURE OF INVENTION

Technical Problem

The embodiment provides a method of fabricating silicon carbide powder, capable of improving the recovery rate of the silicon carbide powder by reducing the scattering of the source material, which is caused by reaction gas during the reaction.

Solution to Problem

A method of fabricating silicon carbide powder according to the embodiment comprises the steps of preparing a mixture by mixing a silicon source comprising silicon with a carbon source comprising a solid carbon source or an organic carbon compound; reacting the mixture; and controlling the reacting of the mixture, wherein the controlling of the reacting comprises inputting process gas or reaction product gas.

Advantageous Effects of Invention

According to the method of fabricating silicon carbide powder of the embodiment, process gas or reaction product gas can be introduced in the reaction step of the mixture material.

Therefore, the reaction rate of the silicon source and the carbon source can be controlled, so that the scattering caused by the reaction gas can be reduced, thereby increasing the recovery rate of the silicon carbide powder from the mixture material.

BRIEF DESCRIPTION OF DRAWINGS

FIG. 1 is a flowchart showing a method of fabricating silicon carbide powder according to the embodiment.

MODE FOR THE INVENTION

Hereinafter, a method of fabricating silicon carbide powder according to the embodiment will be described in detail with reference to accompanying drawings.

FIG. 1 is a flowchart showing a method of fabricating the silicon carbide powder according to the embodiment.

Referring to FIG. 1, the method of fabricating the silicon carbide powder according to the embodiment comprises the steps of preparing a mixture by mixing a silicon source comprising silicon with a carbon source comprising a solid carbon source an organic carbon compound (ST10); reacting the mixture (ST20); and controlling the reacting of the mixture (ST30), wherein the controlling of the reacting comprises inputting process gas or reaction product gas.

Hereinafter, each step of the method will be described in more detail.

In step ST10 of preparing the mixture, the silicon source and the carbon source are prepared and mixed to form a mixture material.

The silicon source may comprise various materials capable of providing silicon. For instance, the silicon source may comprise silica sol, silicon dioxide, fine silica and quartz powder, but the embodiment is not limited thereto. For instance, an organic silicon compound comprising silicon may be used as the silicon source.

The carbon source may comprise a solid carbon source or an organic carbon compound.

The solid carbon source may comprise a carbon black, a carbon nano tube (CNT) or fullerene (C60).

The organic carbon compound may comprise phenol resin, franc resin, xylene resin, polyimide, polyurethane, polyacrylonitrile, polyvinyl alcohol, cellulose, sugar, pitch, or tar.

The carbon source and the silicon source may be mixed with each other through the wet mixing process using the solvent or the dry mixing process without using the solvent. According to the wet mixing process, the carbon source can be conglomerated with the silicon source, so that the productivity can be improved. In addition, according to the dry mixing process, the cost for the solvent can be saved, the pollution caused by the solvent can be prevented, and the carbonization process can be omitted, so that the process can be simplified.

The silicon source and the carbon source are mixed by using a ball mill or an attrition mill to recover mixture powder. The mixture powder can be recovered by filtering the mixture through a sieve.

The silicon source and the carbon source can be mixed in a predetermined mass ratio. For instance, a mole ratio of carbon comprised in the carbon source to silicon comprised in the silicon source (hereinafter, referred to as mole ratio of carbon to silicon) is in the range of about 1:1.5 to 1:3. If the mole ratio of carbon to silicon exceeds 3, the amount of carbon is so excessive that the amount of residual carbon, which does not participate in the reaction, is increased, lowering the recovery rate. In addition, if the mole ratio of carbon to silicon is less than 1.5, the amount of silicon is so excessive that the amount of residual silicon, which does not participate in the reaction, is increased, lowering the recovery rate. That is, the mole ratio of carbon to silicon must be determined by taking the recovery rate into consideration.

Since the silicon source is volatilized into a gas phase at the high temperature during the reaction, the mole ratio of carbon to silicon is set in the range of 1.8 to 2.7.

The silicon source is uniformly mixed with the carbon source to form the mixture.

In step ST20 of reacting the mixture, the mixture is subject to the reaction to form the silicon carbide. In detail, mixture powder is weighed in a graphite crucible and then the mixture powder is supplied and heated in a high-temperature reaction furnace, such as a graphite furnace. The process to form the silicon carbide may be classified into the carbonization process and the synthesis process.

In the carbonization process, the organic carbon compound is carbonized so that carbon is produced. The carbonization process is performed at the temperature in the range of about 600° C. to about 1200° C. In detail, the carbonization process is performed at the temperature in the range of about 800° C. to about 1100° C. If the solid carbon source is used as the carbon source, the carbonization process may be omitted.

After that, the synthesis process is performed. In the synthesis process, the silicon source is reacted with the solid carbon source or the organic carbon compound, so that the silicon carbide is formed through following reaction formulas 1 to 3.

$$SiO_2(s)+C(s)\rightarrow SiO(g)+CO(g) \quad \text{[Reaction formula 1]}$$

$$SiO(g)+2C(s)\rightarrow SiC(s)+CO(g) \quad \text{[Reaction formula 2]}$$

$$SiO_2(s)+3C(s)\rightarrow SiC(s)+2CO(g) \quad \text{[Reaction formula 3]}$$

In order to facilitate the above reaction, the heating temperature is set to 1300° C. or above. If the heating temperature is set in the range of 1300° C. to 1900° C., the fabricated silicon carbide may have the β type, which is the low-temperature stable phase. The silicon carbide having the β type consists of fine particles, so the strength of the silicon carbide can be improved. However, the embodiment is not limited thereto. For instance, if the heating temperature exceeds 1800° C., the silicon carbide may have the α type, which is the high-temperature stable phase. The synthesis process may be performed for about 1 hour to about 7 hours.

Then, in step ST30 of controlling the reaction, process gas or reaction product gas is supplied.

As described above in the step of reacting the mixture, the mixture powder of the silicon source and the carbon source is supplied and heated in the graphite crucible serving as the high-temperature reaction furnace. At this time, the mixture powder formed at the lower portion of the graphite crucible is primarily evaporated, so that $SiO_2$ gas and CO gas are generated. In this case, the CO gas may not participate in the reaction any more, but may be exhausted to the outside. As the CO gas is exhausted to the outside, the mixture powder formed at the upper portion of the graphite crucible is scattered by the CO gas. At this time, the recovery rate of the silicon carbide powder may be significantly lowered on the basis of the input amount of source materials due to the scattering of the mixture powder. That is, the recovery rate of the silicon carbide powder may be lowered depending on the flow of the CO gas and the production rate of the CO gas.

According to the method of fabricating the silicon carbide powder of the present embodiment, the flow of the CO gas is controlled by adjusting the vacuum degree in the reaction furnace and the production rate of the CO gas is controlled by adjusting the reaction rate of above reaction formal 1, which is the rate limiting reaction.

According to the method of fabricating the silicon carbide powder of the present embodiment, in step ST30 of controlling the reaction, the process gas or the reaction product gas is supplied into the graphite crucible to control the vacuum degree of the reaction environment and the reaction rate of reaction formula 1. The process gas may comprise inert gas, such as He or Ar, or N2. In addition, the reaction product gas may comprise CO gas.

The process gas controls only the reaction atmosphere, that is, the vacuum degree without participating in the reaction. The process gas may be supplied while the step of reacting the mixture is being carried out. The process gas may lower the vacuum degree of the vacuum furnace. That is, the flow of the reaction gas is controlled by lowering the vacuum degree of the vacuum furnace. For instance, the reaction may start at the initial vacuum degree of $5\times10^{-2}$ torr and the vacuum degree may become higher as the reaction proceeds, so the flow of the CO gas produced during the reaction may become fast. At this time, the process gas is supplied to lower the vacuum degree (that is, pressure is increased), thereby controlling the flow of the CO gas. As a result, the scattering of the mixture material caused by the CO gas may be reduced, so that the recovery rate of the silicon carbide powder can be increased.

In addition, the reaction product gas may restrict the forward reaction of reaction formula 1. That is, if the CO gas serving as the reaction product is supplied during the reaction of reaction formula 1, the forward reaction rate is reduced, so the production rate of the CO gas can be reduced. In detail, although the amount of produced CO gas is not changed, the production rate of the CO gas can be reduced. Thus, the scattering of the mixture material caused by the CO gas may be reduced, so that the recovery rate of the silicon carbide powder from the mixture powder can be increased.

The vacuum degree and the reaction rate can be simultaneously controlled by simultaneously supplying the process gas and the reaction product gas.

Hereinafter, the method of fabricating the silicon carbide powder according to the embodiments and comparative example will be described in more detail. The following embodiments are illustrative purpose only and the disclosure is not limited to the embodiments.

Embodiment 1

About 1 g of fumed silica and about 1.2 g of phenol resin were mixed to prepare mixture 1. At this time, the average grain size of the fumed silica was about 30 nm and the residual rate of carbon in the phenol resin after the carbonization process was about 60%. In addition, about 6 kg of the source material was input in the crucible of 500φ×100 H.

After that, the mixture 1 was subject to the carbonization process at the temperature of about 850° C. for five hours while rising the temperature at the rate of 3° C./min and then subject to the synthesis process at the temperature of about 1700° C. for three hours while rising the temperature at the rate of 5° C./min, thereby forming silicon carbide powder 1.

The reaction was started at the initial vacuum degree of $5\times10^{-2}$ Torr or less and continued by operating a rotary pump. In addition, argon gas was supplied as process gas at the rate of 5 L/min.

Embodiment 2

Mixture 2 was prepared by mixing fumed silica and phenol resin under the same composition and same condition of embodiment 1 except that CO gas serving as reaction gas was supplied at the rate of 5 L/min, instead of argon gas.

Then, the carbonization process and the synthesis process were carried out under the same condition of embodiment 1, thereby forming silicon carbide powder 2.

Embodiment 3

Mixture 3 was prepared by mixing fumed silica and phenol resin under the same composition and same condition of embodiment 1 except that mixed gas comprising argon gas and CO gas in the mole ratio of 6:4 was supplied at the rate of 5 L/min, instead of argon gas.

Then, the carbonization process and the synthesis process were carried out under the same condition of embodiment 1, thereby forming silicon carbide powder 3.

Comparative Example 1

Silicon carbide powder 4 was formed in the same manner as that of embodiment 1 except that argon gas was not supplied.

The recovery rate of the silicon carbide powder fabricated according to embodiments 1 to 3 and comparative example 1 is shown in Table 1.

TABLE 1

| sample | Recovery rate (wt %) |
| --- | --- |
| Silicon carbide powder 1 | 25 |
| Silicon carbide powder 2 | 31 |
| Silicon carbide powder 3 | 29 |
| Silicon carbide powder 4 | 16 |

Referring to Table 1, the recovery rate of the silicon carbide powder according to embodiments 1 to 3 is higher than the recovery rate of the silicon carbide powder according to comparative example 1. Thus, if the process gas, such as argon gas, and the CO gas serving as the reaction product gas are supplied, the recovery rate of the silicon carbide powder can be increased.

That is, the process gas, such as argon gas, can control the vacuum degree during the reaction so that the scattering of the mixture material caused by the reaction gas can be effectively controlled. In addition, since the reaction product gas is supplied during the reaction, the forward reaction of the rate limiting reaction can be controlled, so that the scattering of the mixture material can be controlled, thereby increasing the recovery rate of the silicon carbide powder.

Any reference in this specification to "one embodiment," "an embodiment," "example embodiment," etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of fabricating silicon carbide powder, the method comprising:
    preparing a mixture by mixing a silicon source comprising silicon with a carbon source comprising a solid carbon source or an organic carbon compound;
    reacting the mixture; and
    controlling the reacting of the mixture,
    wherein the controlling of the reacting comprises supplying reaction product gas,
    wherein the reaction product gas comprises carbon monoxide (CO) gas, and
    wherein the reaction product gas restricts a forward reaction of the reacting that is based on a reaction formula 1:

$SiO2(s)+C(s) \rightarrow SiO(g)+CO(g)$.

2. The method of claim 1, wherein the silicon source comprises at least one selected from the group consisting of silica sol, silicon dioxide, fine silica and quartz powder.

3. The method of claim 1, wherein the solid carbon source comprises at least one selected from the group consisting of carbon black, a carbon nano tube, and fullerene.

4. The method of claim 1, wherein the organic carbon compound comprises at least one selected from the group consisting of phenol resin, franc resin, xylene resin, polyimide, polyurethane, polyacrylonitrile, polyvinyl alcohol, cellulose, pitch, tar, and sugar.

5. The method of claim 1, wherein the reacting of the mixture comprises:
    carbonizing the organic carbon compound; and
    reacting the carbonized organic carbon compound with the silicon source.

6. The method of claim 1, wherein the silicon source is mixed with the carbon source in a mole ratio of 1:1.5 to 1:3.

7. The method of claim 1, wherein the silicon source is mixed with the carbon source in a mole ratio of 1:1.8 to 1:2.7.

* * * * *